United States Patent [19]
Klein

[11] Patent Number: 4,568,463
[45] Date of Patent: Feb. 4, 1986

[54] METHOD AND APPARATUS FOR THE PURIFICATION OF WATER AND OTHER AQUEOUS LIQUIDS

[76] Inventor: Samuel H. Klein, 695 Richmond Rd., Ottawa, Ontario, Canada, K2A 0G6

[21] Appl. No.: 617,620

[22] Filed: Jun. 6, 1984

Related U.S. Application Data

[63] Continuation-in-part of Ser. No. 469,441, Feb. 24, 1983, abandoned.

[51] Int. Cl.$^4$ .............................................. C02F 3/08
[52] U.S. Cl. .................................. 210/607; 210/616; 210/618; 210/150
[58] Field of Search ............... 210/150, 151, 607, 616, 210/617, 618, 193, 778, 503, 504, 500, 197, 198-202, 621, 622, 625, 614

[56] References Cited

U.S. PATENT DOCUMENTS

| | | | |
|---|---|---|---|
| 1,617,014 | 2/1927 | Derleth | 210/626 |
| 3,342,731 | 9/1967 | Baumann et al. | 210/193 |
| 3,734,850 | 5/1973 | Karr | 210/617 |
| 3,755,157 | 8/1973 | Wisfeid et al. | 210/618 |
| 3,928,190 | 12/1975 | Bebin | 210/618 |
| 3,933,629 | 6/1976 | Smith | 210/618 |
| 3,957,632 | 5/1976 | Knopp et al. | 210/616 |
| 4,033,875 | 7/1977 | Besik | 210/197 |
| 4,167,479 | 9/1979 | Besik | 210/610 |
| 4,168,228 | 9/1979 | Mallatt et al. | 210/616 |
| 4,271,013 | 6/1981 | Bhattacharyya | 210/617 |
| 4,274,966 | 6/1981 | Palmer | 210/618 |
| 4,289,626 | 9/1981 | Knopp et al. | 210/616 |
| 4,292,176 | 9/1981 | Grutsch et al. | 210/616 |
| 4,407,717 | 10/1983 | Teletzke et al. | 210/616 |
| 4,415,454 | 11/1983 | Fuchs | 210/617 |

FOREIGN PATENT DOCUMENTS

| | | |
|---|---|---|
| 959980 | 12/1974 | Canada . |
| 979547 | 12/1975 | Canada . |
| 1006993 | 3/1977 | Canada . |
| 1024275 | 1/1978 | Canada . |
| 1033669 | 6/1978 | Canada . |
| 1076721 | 4/1980 | Canada . |
| 1084181 | 8/1980 | Canada . |
| 0053772 | 6/1982 | European Pat. Off. . |
| 0062543 | 10/1982 | European Pat. Off. . |
| 51-73755 | 6/1976 | Japan .................................. 210/150 |
| 374125 | 6/1932 | United Kingdom . |
| 1402369 | 8/1975 | United Kingdom . |
| 1479553 | 7/1977 | United Kingdom . |

*Primary Examiner*—Benoit Castel

[57] ABSTRACT

A method and apparatus for the purification of water or other contaminated aqueous liquids. The water is passed through a filter comprising a solid backwashable filter medium preferably having pores or slots of 125 microns (0.005 inches) or less made of biologically nondegradable and non-corrosive material, and having a specific, non-pathogenic aerobic activated sludge layer deposited thereon. The aerobic sludge layer is prepared by aerating mixtures of raw water, diatomaceous earth and preferably an inert particulate biologically non-degradable filter material (such as cellulose powder), for a minimum period of 24 hours, and preferably at least five days. The resulting mixtures containing a specific, non-pathogenic aerobic activated microbiological sludge is recirculated through the solid filter medium in a specific sequence until an activated sludge layer is deposited thereon to the desired thickness. The resulting micronic microbiological filter is more efficient, less bulky, cleaner and easier to use than conventional sand and/or anthracite coal beds used as filters in conventional municipal water treatment plants and the like. When water passed through the resulting filter is then passed through an activated carbon contactor bed at controlled flow rates, the microorganisms colonize the bed and complete the biological degradation or organics contained in the water. Subsequent disinfection (e.g. with chlorine) makes the water potable.

34 Claims, 4 Drawing Figures

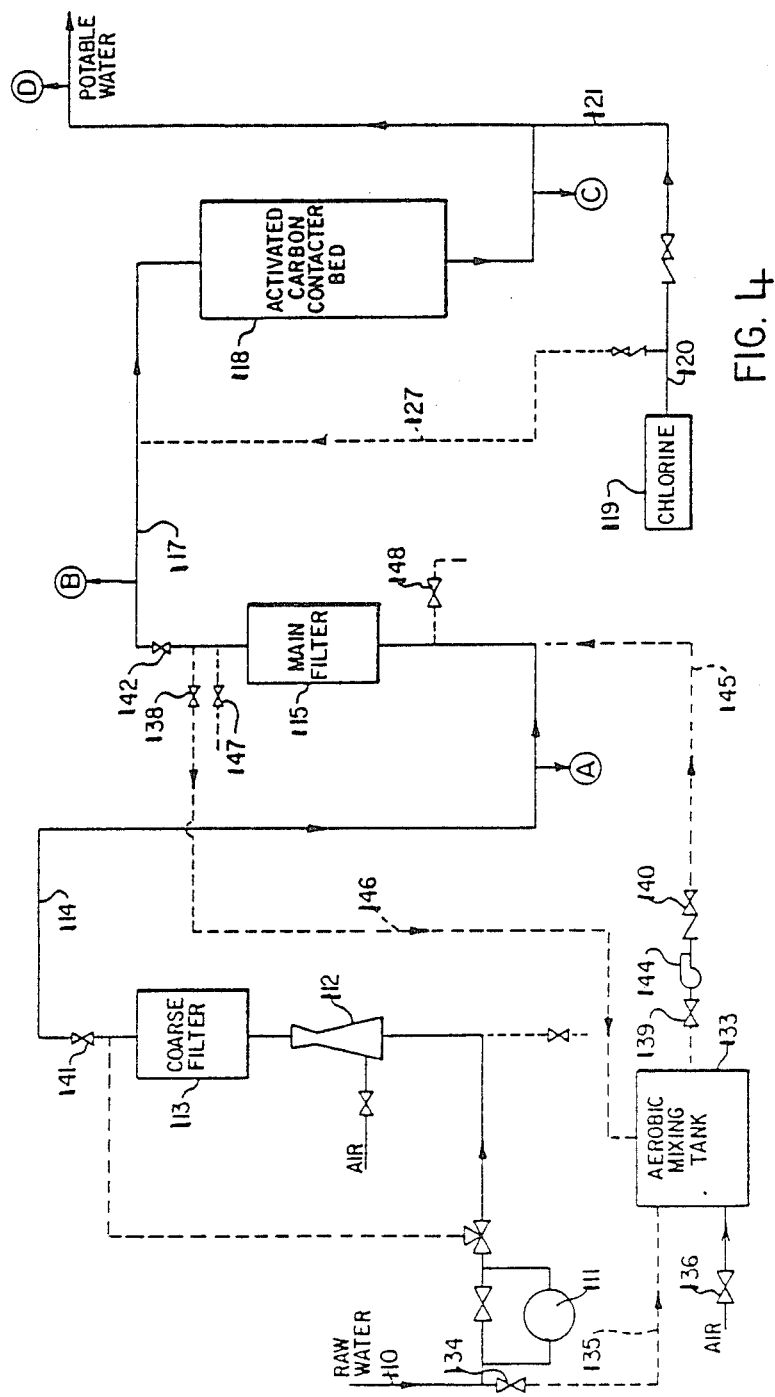

METHOD AND APPARATUS FOR THE PURIFICATION OF WATER AND OTHER AQUEOUS LIQUIDS

CROSS-REFERENCE TO RELATED APPLICATION

This is a continuation-in-part of application Ser. No. 469,441, filed on Feb. 24, 1983, now abandoned.

BACKGROUND OF THE INVENTION

I. Field of the Invention

This invention relates to a method and apparatus for the purification of water and other aqueous liquids. More particularly, the invention relates to the purification of raw water from a reservoir, river, lake or the like to make it potable and suitable for distribution to consumers, and to the purification of other contaminated aqueous liquids.

II. Discussion of the Prior Art

Raw water from a source such as a reservoir, river or lake must be treated to remove pathogenic bacteria, certain pollutants, solids and colouring materials before it can be distributed to consumers. During the past eighty years or so there have been very few innovations in municipal raw water treatment plants and most comprise the following:

(1) bar screens;
(2) coagulation, followed by flocculation and sedimentation;
(3) gravity feed sand and/or anthracite coal filter beds;
(4) disinfection (super chlorination) and perhaps fluoridation; and
(5) waterworks distribution.

One of the disadvantages of this type of water treatment plant is that the filtration efficiency is not constant. The sand and/or anthracite coal filter beds require the formation of a microbiological sludge layer to be fully established on the surface of the beds before they operate efficiently. Eventually the filters become clogged and have to be fluidized and backwashed, which destroys the sludge layer. Until the layer is restored and completely covers the top of the filter bed, which may take three to twenty four hours, particles of up to 75 microns (0.003 inch) in size may pass through the bed, which means that pathogenic bacteria (e.g. fecal coliforms and pseudomonas) may pass uninhibited through the bed. Once the sludge layer is restored, the bed is capable of trapping particles 1 micron or greater in size. The decreased efficiency of the filter bed requires an increase in the use of chlorine to ensure proper disinfection, but this results in increased corrosion of the distribution system, a bad odour and taste in the drinking water, an increase in the quantities of chlorinated organic and other compounds in the water that may be harmful to health, and increased cost.

Furthermore, sand and coal beds tend to be extremely large, resulting in increases in total plant costs, and are expensive to backwash because large amounts of clean water must be used (and disposed of in a non-polluting way) and steps must be taken to ensure that the beds pack properly so as not to leave large channels through which pollutants could easily pass.

Other types of filters have been tried in the past, but those that do not permit the immediate formation of a microbiological sludge layer are not as effective. The activated aerobic sludge layer contains predominantly aerobic, generally non-pathogenic bacteria, protozoa and microorganisms that may trap and/or consume and cause the death of certain pathogenic bacteria and viruses, or at least propagate at the expense of such pathogenic microorganisms by consuming available nutrients. The activated sludge layer also traps solids, including colloidal particles, certain heavy metals and substances that may be precipitated, and reduces the concentration of certain organic chemicals normally present in the water. Thus, the presence of such a layer is extremely effective in the purification of water.

OBJECT OF THE INVENTION

It is therefore a primary object of the invention to provide a new type of method and apparatus for improved and efficient purification of water and other aqueous liquids.

Another object of the invention is that it can permit the natural and preferred utilization of non-pathogenic aerobic bacteria in concentrated quantities to reduce organic substances in raw water and other aqueous liquids containing dissolved oxygen.

Another object of the invention is that it can provide a water purifying filter that can be brought into efficient service quickly following more economical cleaning, or backwashing.

Another object of the invention is that it can provide a filter space of reduced physical size compared to a conventional sand or coal filter.

SUMMARY OF THE INVENTION

The invention relates to a method and apparatus for purifying raw water and other aqueous liquids in which a filter is prepared in a special way. The filter is formed by providing a solid filter medium, e.g. a filter screen having holes of $125\mu$ or larger in size and forming a layer of a specific aerobic activated sludge material on the solid filter medium. The specific aerobic sludge material is formed by aerating a mixture of a quantity of the raw water or other aqueous liquid with diatomaceous earth particles and, if necessary, an inert particulate filter material, such as cellulose particles. The aeration of the water encourages the growth of aerobic, non-pathogenic bacteria at the expense of pathogenic bacteria and the resulting slime-like biological material coats the particles contained in the water and makes them "sticky" to some extent. The resulting mixture is recirculated through the solid filter medium to form the desired microbiological layer. The filter is then ready for use and the microbiological layer makes it possible to trap very small particles (e.g. 1 micron in size and larger), but the filter tends not to become blocked for a considerable length of time and is easy to backwash when necessary.

In a preferred form of the invention, water passed through the filter is then also passed through an activated carbon contactor bed where further purification takes place, as will be explained later.

The term "backwashable solid filter medium" used herein is intended to mean any type of solid filter of sufficient strength and durability to withstand repeated backwashing without degradation. The term does not include a biological sludge layer that may be formed on such a filter medium, but refers rather to the solid support used to trap and maintain such a sludge layer. Non-limiting examples are filter screens having holes, pores or slots, particle beds, e.g. of sand which can be recompacted after backwashing, or porous solids such as sintered ceramics. The openings in the filter medium should be large enough to allow rapid and effective backwashing, but should be small enough to trap and support the activated sludge layer, as explained below.

A solid filter medium generally has a minimum opening size that is too large to trap microbial particles, so an activated sludge layer forms very slowly, if at all, when raw water is fed through the filter medium. This problem is solved in the present invention by growing the microorganisms in the presence of particles of diatomaceous earth, and then passing the "sticky" particles through the solid filter medium. If the diatomaceous particles are too small, the desired activated sludge layer takes too long to form because the particles pass directly through the filter medium and few are retained. This problem is overcome in either one of two ways, i.e. diatomaceous earth particles of a sufficiently large size to be retained on the solid filter can be employed, or an inert particulate filter material (e.g. cellulose particles) of sufficiently large size to be retained on the solid filter may be employed in conjunction with small diatomaceous earth particles. In the latter case, the inert particulate filter material is first trapped by the solid filter, and then the small diatomaceous earth particles become trapped in the layer of the inert particulate filter material. This entrapment process is facilitated if that both the diatomaceous earth particles and the inert filter material particles are "sticky" because of their intimate contact with the microbiological component over a period of time.

The term "inert particulate filter material" as used herein, is intended to mean a particulate solid that does not react adversely with the aqueous liquid or any material contained therein and which has particles of a suitable size and nature to be trapped by the solid filter medium without unduly plugging the filter, while at the same time effectively reducing the opening size of the filter so that the small diatomaceous earth particles can be trapped. The preferred material, as noted above, is cellulose because it is fibrous and can enmesh with itself and bridge the openings of the filter medium. However, other particulate materials are effective, particularly if they may enmesh in the same way as cellulose.

The two approaches to the formation of the sludge layer as described above may also, in effect, be combined. For example, if diatomaceous earth particles having a wide range of sizes are employed, some may be large enough to be trapped directly by the solid filter and some may be small enough to pass initially through the filter but be eventually trapped by the established layer of larger particles during recirculation. In this case the large diatomaceous earth particles act as the inert particulate filter material.

As an example of the above, if a solid filter has a minimum pore size of 125 microns ($\mu$), (i.e. 0.005 inches), diatomaceous earth particles having a size range of 1–100$\mu$ (0.00004–0.004 inch) may be employed effectively without the use of any additional inert particulate filter material such as cellulose. Although the largest particles are still smaller than the pores, they are rapidly trapped by the solid filter because of their microbiological coating and because two or more particles jam together in the solid filter pore because of the irregular structure of the outer surfaces of diatomaceous earth particles. Once the large particles start to form a layer on the solid filter, they rapidly trap the smaller particles as the suspended particles are recirculated through the solid filter.

Diatomaceous earth particles found to be suitable in this way are those having median particle sizes of 18$\mu$ (0.00072 inch) (with a range of particle sizes of 1–100$\mu$) and 26$\mu$ (0.00104 inch) (with a range of particle sizes of 2–100$\mu$).

The presence of at least some diatomaceous earth particles of small size (e.g. 1–50$\mu$) is preferred because these particles result in the formation of a sludge layer having very small openings that can trap very small particles from the aqueous liquid. Hence the resulting filter is very efficient.

The aeration of the liquid in the presence of the diatomaceous earth and cellulose (if employed) results in the anaerobic and pathogenic bacteria being reduced or eliminated and non-pathogenic aerobic bacteria being increased significantly. These aerobic bacteria are able to survive on the nutrients in the raw water and are thus efficient at removing these nutrients, which are generally pollutants.

Once the aqueous liquid has passed through the filter it is preferably fed to an activated carbon contactor bed without first being disinfected such as by chlorine. When this is done, the non-pathogenic microorganisms from the filter also colonize the carbon bed. As the water passes through the carbon bed at a suitably controlled rate, the microorganisms complete the biological degradation of organics contained in the aqueous liquid by converting them, inter alia, to carbon dioxide and water. The adsorption properties of the activated carbon bed result in toxic and carcinogenic organics being retained by the carbon, thus facilitating their consumption by the microorganisms and oxidation in this stage. The aqueous liquid leaving the activated carbon contactor bed contains an absolute minimum of harmful and disease-causing organic chemicals. Disinfection of the liquid then kills off any of the non-pathogenic microorganisms that may escape the carbon bed.

DESCRIPTION OF THE DRAWINGS

FIG. 4 is a flow diagram similar to FIG. 1 showing another embodiment of the invention.

DESCRIPTION OF THE PREFERRED EMBODIMENTS

Figure 1:
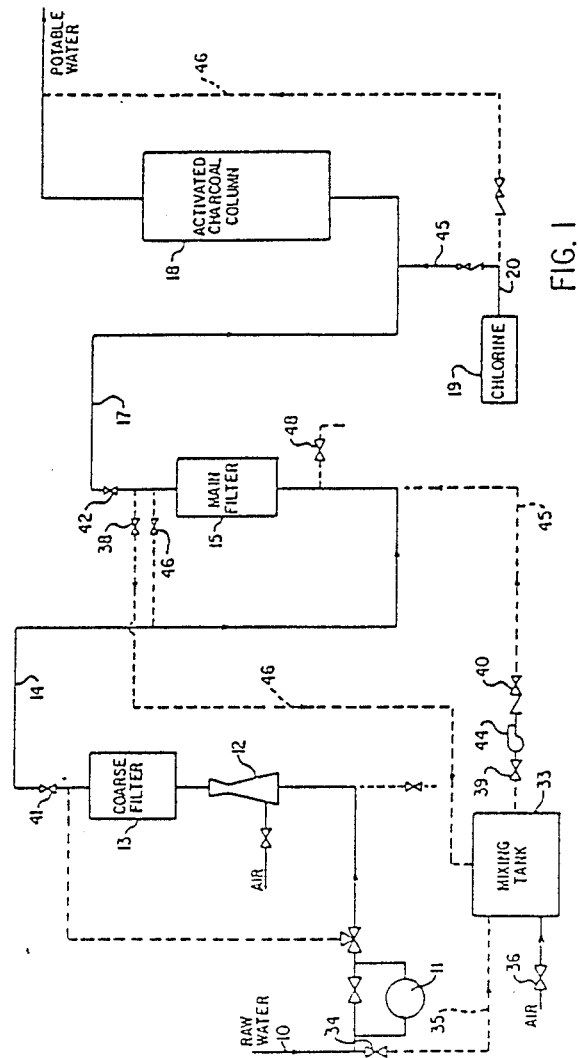
FIG. 1 is a flow diagram of a water treatment plant according to one embodiment of the invention.

FIG. 1 is a flow diagram showing one embodiment of the present invention. The general operation of this embodiment is as follows. Raw water, i.e. water from a reservoir, river, lake or other source, is drawn into the system through pipe 10 and the rate of flow is monitored by a meter 11. The water is aerated (if necessary, as will be explained later) at aerator 12 and then passes through a coarse backwashable filter 13 designed to trap sand, mud and other relatively large particles that may be contained in the raw water (e.g. particles of 125$\mu$ (0.005 inches) and larger).

The water then passes through pipe 14 to an aerobic activated sludge filter 15 used for removing many, if not all, of the remaining impurities (e.g. suspended and colloidal) in the raw water. The nature of this filter is described in detail later.

The water passes from the filter 15 through pipe 17 to an activated carbon contactor column 18. However, before the water enters the column 18, it is chlorinated from a chlorine source 19 connected to pipe 17 by pipe 20. The chlorination destroys any remaining bacteria in the water and the activated carbon removes odour, colour, taste or pollutants. After leaving the activated carbon contactor column 18, the water is potable and can be fed into a municipal distribution system.

Figure 2:
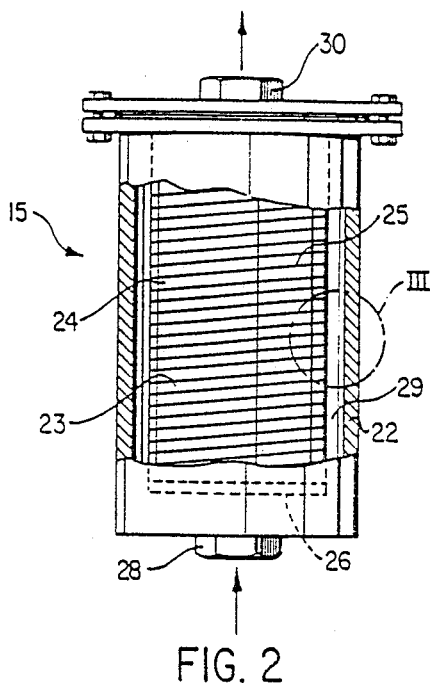
FIG. 2 is an elevational view of the filter unit used in the plant of FIG. 1 having the external casing shown partly cut away.
Figure 3:
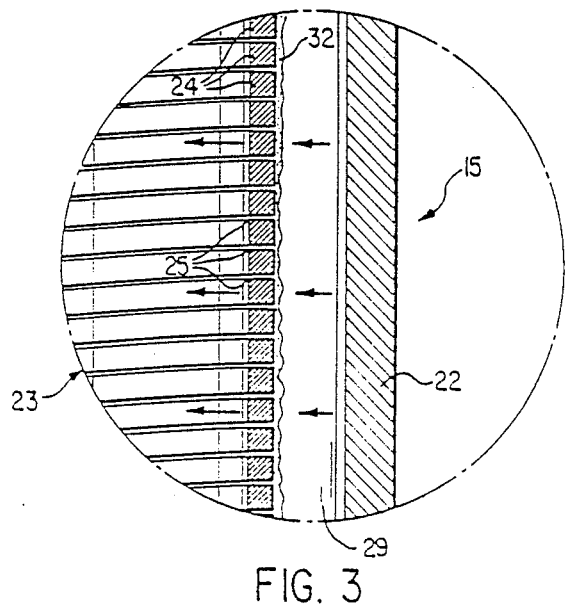
FIG. 3 is a detail on an enlarged scale of part of FIG. 2.

An important part of the apparatus is the microbiological filter 15, which is shown in detail in FIGS. 2 and 3. The filter consists of a casing 22 made of metal or plastic enclosing a solid coarse filter medium 23 in the form of a screen made of a spiral 24 (see FIG. 3) of relatively inert material such as stainless steel, non-corrosive alloys or plastic. The spiral is provided with a narrow gap 25 between its coils. The gap can be made as narrow as possible to a maximum of about 250 microns (0.01 inches), but is preferably about 125 microns (0.005 inches). The spiral 24 is preferably supported by narrow vertical rods (not shown) attached to the coils of the spiral on its inside surface, and is provided with an imperforate end cap 26 so that water can pass from one side of the screen to the other only through the narrow gap 25.

Raw water from pipe 14 enters the filter 15 through the lower port 28, moves into the space 29 between the spiral 24 and the casing 22, passes through the narrow gap 25 to the inside of the spiral (as shown by the arrows in FIG. 3) and exits the filter 15 through the upper port 30.

During a filtering operation, the outermost surface of the filter unit 23 has a layer 32 (see FIG. 3) of a specific aerobic activated sludge material, which acts as a fine filter that traps small particles and, as a result of the presence of a microbiological component, is able to trap pathogenic bacteria, bacterial slime, organic materials and other pollutants. This layer 32 is deposited on the filter screen 23 by a special procedure outlined below, and comprises an inert, biologically non-degradable, particulate filter material (preferably powdered cellulose) and diatomaceous earth in addition to the microbiological component. The particles of the filter material preferably have an average diameter of about 300$\mu$ (0.012 inches) and the diatomaceous earth particles preferably have a median size of about 7.5$\mu$ (0.0003 inch). The particle sizes are not particularly important, provided the following mechanism can take place. The cellulose particles are made large enough to form a support for the diatomaceous earth particles which would otherwise pass directly through the screen because of their small size. The diatomaceous earth particles, in turn, form a very fine jagged filter and a suitable environment for the deposition, entrapment and growth of microorganisms and slime and entrapment of organics necessary for the microbiological activity of the activated aerobic sludge layer.

The aerobic activated sludge layer 32 is deposited on the filter screen 23 in the following manner before the filter 15 is first used for filtering the raw water. Referring to FIG. 1, a quantity of raw water is collected in a tank 33 by opening valve 34 in pipe 35. Air is then bubbled through, or injected into, the water in tank 33 from an air supply line 36. First, a predetermined quantity of cellulose powder (or other inert, preferably fibrous, particulate filter material) and secondly diatomaceous earth is introduced into the tank and the air bubbling is continued for a period of time sufficient to allow the formation of a concentrated specific non-pathogenic microbiological sludge. The time usually required to form the aerobic sludge in tank 33 is at least two hours, preferably 24 hours and more preferably at least five days. The time period of at least five days is particularly advantageous because specific and conditioned non-pathogenic, aerobic microorganisms have by then increased at the expense of pathogenic microorganisms which are substantially or completely eliminated. The optimum time required for the formation of the aerobic sludge can be found by sampling the water from tank 33 as the aeration proceeds. Aeration can be terminated when the pathogenic microorganisms are no longer present or present only in small quantities. The relative and absolute quantities of water, cellulose and diatomaceous earth are not particularly important, but there should be enough cellulose and diatomaceous earth that a suitable filter layer can be formed, but not so much that the mixture becomes difficult to pump through the pipes. Automatic means (not shown) may be used to introduce measured quantities of the cellulose and diatomaceous earth into the aerobic mixing tank 33 from suitable sources thereof. There is no need to seed the raw water with the aerobic bacteria and protozoa which form the aerobic sludge because they are always present in raw water sources and the presence of oxygen and organics promotes their growth. The sludge is preferably kept stirred in the tank 33, either by aeration or by a mechanical stirrer (not shown). The tank may also be warmed by a heating device (not shown) to further promote the microbial growth.

When the sludge has developed sufficiently in the tank 33, it is passed through screen 23 by opening valves 38, 39 and 40, closing valves 41 and 42, and operating pump 44. This causes the sludge from the tank to be circulated through pipe 45, the filter 15, pipe 46 and back to the tank 33. The rate of flow should be high enough to keep the aerobic sludge particles in suspension between the tank 33 and filter 15. The gap 25 in the filter screen 23 is usually too large to trap the diatomaceous earth particles and the microbial material, but first traps the cellulose material that forms a filter base. Repeated circulation of the activated sludge material results in diatomaceous earth becoming trapped in the filter base and finally the microbial sludge is trapped to form the required activated aerobic sludge layer 32. Since the cellulose and diatomaceous earth were present in tank 33 when the microbiological sludge material was growing, the particles of these materials tend to be coated with microorganisms, which makes them "sticky" and this promotes the formation of the layer and also seeds the activated layer throughout for further aerobic microbial growth. Once the layer 32 has formed to the desired thickness (this usually takes $\frac{1}{4}$ hour or less and is apparent from the increased presure drop across the filter 15), the recirculation of the activated sludge from tank 33 can be stopped and the filter 15 is then ready for use in filtering raw water from pipe 14. The mixture from tank 33 may be introduced into the raw water pipe 14 if there appears to be minor damage to the sludge layer 32 during filtering of the raw water.

An alternative procedure involves first aerating a mixture of raw water and cellulose in tank 33 and recirculating this through the filter 15, then adding diatomaceous earth to the tank 33, re-commencing aeration, and then recirculating this mixture through the filter 15.

If desired, the cellulose and diatomaceous earth may be aerated with raw water in separate tanks, and then separately recirculated through the filter 15, the cellulose being recirculated first. In any event, the sludge layer 32 comprises the cellulose, diatomaceous earth and a microbiological component.

The termination of the recirculation of the aerobic activated sludge and the commencement of the flow of raw water for filtering should be carried out in such a way that a constant pressure is maintained before the filter unit 23, i.e., so that pressure is maintained on the filter cake layer 32 in the direction of the arrows shown in FIG. 3. This prevents the layer 32 from becoming partially dislodged and maintains the desired compression of the activated sludge layer. This can be achieved by partially or completely opening valve 41 before valves 38, 39 and 40 are closed.

The aerobic activated sludge layer 32 is capable of trapping particles having a diameter of ½ to 1 micron (0.00002 to 0.000039 inches). Further, it is believed that the enzymes released by the life and death cycle of the microorganisms are capable of trapping organic material, certain pathogenic microorganisms, heavy metals and other toxic substances. Moreover, non-pathogenic microorganisms increase at the expense of pathogenic bacteria such as fecal coliforms.

After passing through the fine filter 15, most of the micronic harmful substances and microorganisms have been removed from the raw water. However, it is still desirable to disinfect (e.g. chlorinate) the water to ensure complete disinfection and removal of pathogenic microorganisms which might grow in the water distribution system. The concentration of chlorine employed is considerably less than conventionally used because the fine filter 15 is usually more efficient than conventional filter beds. Further, the aerobic activated sludge layer can be reestablished quickly when the filter has been cleaned or backwashed.

It is optional to chlorinate the water via pipe 45 before it passes through the activated carbon contactor column 18, but alternatively, chlorination may take place via pipe 46 after the water has passed through column 18. Chlorination ahead of the column 18 ensures that no bacterial growth can take place in the column 18 itself, although some of the chlorine is removed by the carbon so more is required than for post-chlorination.

The activated carbon contactor column 18 is employed to remove any residual organics and objectionable taste, odour, colour and toxic and carcinogenic substances from the water.

Conventional additives, such as fluorine, can be introduced into the water supply downstream of the activated carbon contactor column, if desired.

Air injection into the raw water supply is only carried out if it is needed since the raw water may already contain sufficient oxygen to support the aerobic microorganisms in the activated sludge layer 32. If aeration is required, air from a compressor may simply be bubbled into the raw water and there is no need for complex and expensive apparatus. The presence of the coarse sand and mud filter 13 downstream of the place where the air is introduced helps to break up any large air bubbles that could damage the microbiological layer 32 in the filter 15. When aeration of the raw water is carried out, it is preferably done as far as possible upstream of the filter 15 to allow dispersion of the bubbles and to allow microbial growth in the water before it passes through the filter.

A particular advantage of the present invention is that the filter 15 can be prepared for use very quickly and can be cleaned and put back into operation in a very short time. Cleaning is achieved by backwashing the filter screen 23 for about 30 seconds, e.g. by opening valve 46 and drain valve 48, which immediately flushes the activated sludge layer 32 from the screen. A fresh activated sludge layer is then established on screen 23 by the procedure outlined above, i.e., by recirculation of the activated sludge from tank 33 through the filter 15 and back to the tank. By commencing bubbling of the air through the sludge materials in tank 33 in advance of the backwashing operation, the activated sludge can be ready for use immediately if it is required to form the new filter layer 32. By providing multiple filter units 15, one can be readied for use when another is about to be cleaned so that filtering can continue uninterrupted. Backwashing of filter 15, when necessary, only uses about 3% of the clean water required by conventional sand and coal filters. This enables the used sludge to be drained and treated in a conventional sewage treatment plant since relatively small quantities are involved.

The filter 15 has the advantages over a conventional sand or coal filter bed that the filtering is carried out efficiently at all times and that cleaning is easy. Further, the filter is much less bulky than conventional filter beds. Additionally, conventional flocculation, coagulation and sedimentation steps can be eliminated, thus substantially reducing the size of the plant and its operational and maintenance costs. It is found that the materials used for coagulation and sedimentation in a conventional plant tend to block the microbiological layer, so cleaning of a conventional plant may be required more frequently.

The filter screen 23 forms a solid sheet of material that can be backwashed with a small amount of liquid. Small amounts of such flushing liquids can be disposed of in a conventional sewage system so there is no problem of waste disposal. Further, backwashing does not disturb the filter screen, and merely removes the microbiological filter layer, in contrast to conventional filter beds in which repacking of the sand or coal particles must be carried out carefully after backwashing. The flow rate through the filter can also be controlled more easily than in the case of a conventional filter bed.

Although the preferred filter screen is as shown in FIGS. 2 and 3, any other type of solid filter screen could be employed, e.g. a plate having numerous holes or slots. Preferably, the screen should be sufficiently rigid to resist flexing during use because this could result in the aerobic activated sludge layer becoming partially dislodged.

The inert particulate filter material is employed to bridge the gaps in the filter screen without blocking them. Cellulose or other fibrous materials are suitable for this, but any particulate, relatively inert, biologically non-degradable material having the same effect can be employed. This allows the screen to trap the smaller diatomaceous earth and microorganisms and suspended particles one micron (0.0000393 inch) or larger.

As explained before, an alternative to the use of the inert particulate filter material is the use of large diatomaceous earth particles or a mixture of large and small diatomaceous earth particles.

In certain circumstances, e.g. when filtering relatively clean raw water, the filter may not require backwashing at all or for a very long period of time, because it is found that the activated aerobic layer has less tendency to become clogged than a conventional filter bed, due to the self cleaning ability of the aerobic bacteria that are encouraged to grow.

The fact that less chlorine is required than in a conventional process is important because chlorine may react with residual organic materials to form chlorinated organic and nitrogen compounds, e.g. trihalomethanes, that are harmful to health. Lower concentrations of chlorine reduce the formation of such compounds being formed in significant quantities. There is also less need to control the pH of the purified water produced by the present invention. The pH is sometimes made slightly acidic so that the chlorine is more effective in killing bacteria. This is not necessary if organics and pollutants are reduced and the activated carbon contactor bed is kept clean.

The activated carbon employed in column 18 is preferably in the form of granules rather than a powder because this reduces the risk of the carbon particles escaping the column. The carbon can be desorbed or regenerated after a certain period of time. Eventually, the carbon can be incinerated when its contamination becomes too great.

As shown in FIG. 1, the fluid flow through the various units is vertically upwards.

All materials employed in the apparatus should preferably be substantially non-corrosive and biologically non-degradable.

Another embodiment is shown in the flow diagram of FIG. 4. This embodiment differs from the embmodiment of FIG. 1 primarily in that the flow of water through the activated carbon contactor bed is downwards and in that chlorination of the water takes place after it has passed through the activated carbon contactor bed. Parts shown in FIG. 4 which are equivalent to those shown in FIG. 1 are identified by similar reference numerals except that the prefix "1" has been added. For example, filter 15 of FIG. 1 is equivalent to filter 115 of FIG. 4.

The general operation of this embodiment is as follows. Raw water, i.e. water from a reservoir, river, lake or other source, is drawn into the system through pipe 110 and the rate of flow is monitored by a meter 111. The water is aerated (if necessary) at aerator 112 and then passes through a coarse backwashable filter 113 designed to trap sand, mud and other relatively large particles that may be contained in the raw water (e.g. particles of 125μ (0.005 inch) and larger).

The water then passes through pipe 114 to an aerobic microbiological filter 115 used for removing many of the remaining impurities in the raw water. This filter is the same as the one shown in FIGS. 2 and 3.

The water passes from the filter 115 through pipe 117 to an activated carbon contactor bed 118 and is then chlorinated from a chlorine source 119 via pipe 120 and pipe 121. The activated carbon contacter bed 118 removes odour, colour, taste and micro-pollutants and the chlorination destroys any remaining microorganisms in the water. The resulting water is potable and can be fed to a municipal distribution system.

The aerobic activated sludge layer 32 may be deposited on the filter medium 23 in the same manner as described above in connection with FIG. 1.

After passing through the micronic filter 115, most of the suspended and colloidal solids and many of the toxic substances (both biological and chemical, e.g. heavy metals) have been removed from the raw water. However, the water is then passed through the activated carbon contactor bed 118 where further purification takes place.

The water entering the bed 118 contains dissolved organic chemicals which were present in the raw water and which the filter 115 was not able to remove completely. The water also contains a fairly high concentration of aerobic, non-pathogenic (standard plate count) microorganisms which escape from the microbiological layer in the filter 115. It has unexpectedly been found that it is beneficial to allow the microorganisms to enter and colonize the bed. As a result, the microbiological activated carbon contactor bed 118 is in a position to trap dissolved organic chemicals, especially long chain compounds which the microorganisms convert and consume, inter alia, into carbon dioxide and water. This additional purification step provides a good-tasting water and only a very mild addition of chlorine or other disinfectant (e.g. chlorine dioxide) downstream of the bed 118 via pipes 120 and 121 is required in order to kill any remaining pathogenic microorganisms, making the water perfectly safe to drink.

The removal of organic chemicals before chlorination takes place is particularly advantageous because the reaction between the chemicals and the chlorine often results in the production of harmful, carcinogenic materials, such as tri-halo methanes.

From time to time it may be desirable to kill off or reduce the number of the non-pathogenic microorganisms in the contactor bed 118, or to disinfect and clean the bed if it is colonized by pathogenic bacteria. This can be done by chlorinating the water from the filter 115 ahead of the bed via pipe 120 and pipe 127.

By trapping the suspended solids, colloidal particles and bacterial slime, the filter 115 prevents the bed 118 from becoming blocked for considerable lengths of time, so that the bed operates efficiently and without undue maintenance requirements.

By feeding the water downwardly through the bed 118, as shown, the flow of water tends to pack the activated carbon granules together more tightly. This results in improved contact between the carbon and water stream and avoids disturbances of the carbon bed that could release large amounts of the non-pathogenic microorgamisms or pollutants from the bed.

The selected non-pathogenic microorganisms that thrive in the bed 118 are those that have been adapted (by selection) to survive on the nutrients found in the raw water and are thus very efficient at removing chemicals and other constituents of the water. Samples of the microorganisms are removed from the bed 118 from time to time and added to the mixing tank 133 used for the formation of the aerobic activated sludge layer in the filter 115, or to the raw water pipe 110. This ensures that the filter layer 32 (FIG. 3) contains suitable specific, non-pathogenic microorganisms and thus improves the effectiveness of the filter 115 in removing impurities from the raw water.

Incidentally, the capacity of the carbon bed 118 should preferably be made large enough, relative to the flow rate of the water, to ensure that the non-pathogenic bacteria come into contact with the water for a sufficient length of time to effectively reduce the concentrations of organic chemicals. This can be determined by trial and experiment for any particular raw water treatment plant.

If desired, ozone or other oxidizing agents can be added to the water from the filter 115 before it enters the activated carbon contactor bed 118. This has the effect of killing anaerobic and pathogenic microorganisms without harming non-pathogenic aerobic microorganisms.

Conventional additives, such as fluorine, can be introduced into the water supply downstream of the activated carbon contactor bed, if desired.

As in the embodiment of FIG. 1, a particular advantage of the present embodiment is that the filter 115 can be prepared for use very quickly and can be cleaned and put back into operation in a very short time. Cleaning is achieved by backwashing the filter medium 23 (FIG. 3) for about 30 seconds, e.g. by closing valves 141 and 142, opening valve 147 (connected to a supply of clean water) and drain valve 148, which immediately flushes the activated sludge layer 32 from the solid filter medium. A fresh activated sludge layer is then established on medium 23 by the procedure outlined above, i.e., by recirculation of the activated sludge from tank 133 through the filter 115 and back to the tank. By commencing bubbling of the air through the sludge materials in tank 133 in advance of the backwashing operation, the activated sludge can be ready for use immediately, if required, to form the new filter layer 32. By providing multiple filter units 115, one can be readied for use when another is about to be cleaned so that filtering can continue uninterrupted. Backwashing of filter 115, when carried out with clean water, only uses about 3% of the clean water required by conventional sand and coal filters. This enables the used sludge to be drained and treated in a conventional sewage treatment plant since relatively small quantities are involved. As an alternative, compressed air may be used to "backwash" the filter in order to reduce the amount of contaminated sludge to be disposed of. In this case, valve 147 is connected to a source of compressed air.

Although the preferred embodiment described above replaces conventional sand or coal beds, a similar procedure can be employed with such conventional beds to quickly provide an aerobic activated sludge layer thereon. Thus, instead of allowing such a layer to grow naturally on a sand or coal bed, the aerobic sludge can be grown in a separate tank employing aeration, and by using diatomaceous earth and, if necessary, cellulose as above, and then the sludge layer can quickly be formed on the filter bed by recirculating the sludge mixture through the sand or coal acting as the solid filter medium.

The invention is particularly suitable for the treatment of raw water to render it potable, but can be employed with other aqueous liquids. For example, polluted water from industrial plants can be purified so that the water can then be safely disposed of in the environment. Other aqueous liquids, such as wine or beer, can be purified in a similar way.

The following is a description of a typical raw water filtering operation according to FIG. 4 of the invention.

EXAMPLE

Raw water taken directly from the Ottawa River at Ottawa, Ontario was purified in a treatment system as shown in FIG. 4. Samples of the water were taken at sampling points A, B, C and D as shown in FIG. 4 and the water samples were each analyzed. The results are shown in Table 1 below.

TABLE 1

| Water Sampling Points | A | B | C | D |
|---|---|---|---|---|
| Temperature °C. | 14.2 | 14.2 | 14.2 | 14.2 |

TABLE 1-continued

| Water Sampling Points | Ⓐ | Ⓑ | Ⓒ | Ⓓ |
|---|---|---|---|---|
| pH | 7.4 | 7.37 | 6.85 | 6.93 |
| Turbidity N.T.U. | 2.5 | 1.0 | 0.14 | 0.14 |
| Colour H.U. | 34.0 | — | <3.0 | <3.0 |
| Dissolved Oxygen % | 7.6 | — | — | 5.0 |
| Dissolved Organic Carbon mg/l | 11.8 | 12.4 | 2.8 | 2.8 |
| Threshold Odour No. | 1 | 1 | 1 | 1 |
| THMs (without μg/l thiosulfate) | — | — | — | — |
| THMs (with μg/l thiosulfate) | — | — | — | — |
| Total Chlorine mg/l | — | — | — | 0.48 |
| Free Chlorine mg/l | — | — | — | 0.43 |
| Total Coliforms/100 ml | >160 | 64 | 62 | <2 |
| Fecal Coliforms/100 ml | 36 | 19 | 35 | 0 |
| STD Plate Count/ml | 860 | 1,500 | >3,000 | 0 |
| Pseudomonas/100 ml | — | — | — | 0 |

Of particular note is the reduced concentration of dissolved organic carbon in sample C (water leaving the bed 118) and the increase in non-pathogenic (standard plate count) microorganisms at each stage prior to chlorination.

The results also show the effectiveness of filter 115 and activated carbon contactor bed 118 in reducing turbidity, colour dissolved organics and coliform bacteria.

I claim:

1. In a method of purifying an aqueous liquid, the steps of:
   (a) aerating a quantity of said liquid in the presence of an inert particulate filter material for a period of time sufficient to permit the formation of an aerobic activated sludge material therein;
   (b) aerating a quantity of said liquid in the presence of powdered diatomaceous earth for a period of time sufficient to permit the formation of an aerobic activated sludge material therein;
   (c) passing said mixtures from steps (a) and (b) through a backwashable solid filter medium for a period of time sufficient for a layer of the aerobic activated sludge material to be deposited on the solid filter medium; and
   (d) feeding aqueous liquid to be purified through said filter medium having said aerobic activated sludge layer deposited thereon.

2. A method according to claim 1 wherein steps (a) and (b) are carried out simultaneously by aerating a mixture of said liquid, particulate filter material and powdered diatomaceous earth.

3. A method according to claim 1 wherein steps (a) and (b) are carried out separately, and the mixture resulting from step (a) is passed through the solid filter medium in step (c) before the mixture from step (b).

4. A method according to claim 1 wherein cellulose is employed as said inert filter material.

5. A method according to claim 1 wherein said mixtures resulting from steps (a) and (b) are recirculated through said solid filter medium in step (c) to allow the layer of aerobic activated sludge material to form to a predetermined thickness suitable for efficient purification of the liquid before step (d) is commenced.

6. A method according to claim 1, which comprises aerating the liquid fed to said filter in step (d).

7. A method according to claim 1 which comprises, after a predetermined period of operation of step (d), re-commencing steps (a) and (b), terminating the feed of liquid to the filter medium in step (d), backwashing the solid filter medium by reversing the flow of liquid through the filter medium to remove the layer of activated sludge material therefrom and disposing of the resulting effluent, then re-commencing step (c) and then re-commencing step (d).

8. A method according to claim 1 wherein an additional step, step (e), comprises further purifying the liquid from step (d).

9. A method according to claim 8 wherein step (e) is achieved by chlorination of the liquid.

10. A method according to claim 8 wherein step (e) comprises passing the liquid from step (d) through a layer of activated carbon to effect further purification.

11. A method according to claim 8, wherein step (e) comprises chlorinating the liquid from step (d) and passing the resulting chlorinated liquid through a layer of activated carbon.

12. A method according to claim 1 wherein the liquid for step (d) is first filtered through a filter medium to remove mud, sand and similar particles that may be present therein.

13. A method according to claim 1 which comprises providing a solid screen as said solid filter medium.

14. A method according to claim 13 wherein said screen is a spiral formed of coils of an inert solid material having a narrow gap between the coils.

15. Apparatus for purifying an aqueous liquid, comprising:
(a) a filter having a layer of aerobic activated sludge material thereon; and
(b) pipe means for supplying liquid to said filter and for conveying filtered liquid from said filter; wherein said filter comprises a solid backwashable filter medium and means are provided for forming said layer of activated sludge material on said filter medium, said layer forming means comprising:
(c) a container for a quantity of said liquid;
(d) means for aerating said liquid in said container;
(e) a source of an inert filter material and diatomaceous earth;
(f) means for enabling the introduction of said inert filter material and said diatomaceous earth into said container;
(g) pipe and pump means for feeding liquid from said container through the filter medium and then recirculating it back to said container.

16. Apparatus according to claim 15, further comprising pipe and valve means for reversing the flow of liquid through said filter medium to remove the aerobic activated sludge layer therefrom when necessary for cleaning the filter.

17. Apparatus according to claim 15 further comprising means for further purifying the liquid conveyed from said filter.

18. A method of purifying an aqueous liquid containing undesired aerobic and anaerobic microorganisms and other contaminants, comprising the steps of:
(a) mixing particles of diatomaceous earth with a quantity of said liquid and then aerating the liquid for a period of time sufficient to result in the formation therein of a sludge material comprising specific non-pathogenic aerobic microorganisms and substantially no anaerobic and pathogenic aerobic microorganisms;
(b) recirculating the treated liquid from step (a) through a backwashable solid filter medium for a period of time sufficient for a continuous layer of the sludge material and diatomaceous earth particles to be deposited on the solid filter medium and then terminating said vecirculation; and
(c) feeding the aqueous liquid to be purified through the said layer and the solid filter medium in order to filter and purify the liquid.

19. A method according to claim 18 wherein at least some of the diatomaceous earth particles are large enough to be trapped by the solid filter medium during step (b).

20. A method according to claim 18 wherein substantially all of the diatomaceous earth particles are large enough to be trapped by the solid filter medium during step (b).

21. A method according to claim 18, which further comprises aerating the liquid employed in step (c) prior to feeding it through said layer and solid filter medium.

22. A method according to claim 18, which further comprises feeding the liquid from step (c) through a bed of activated carbon, followed by disinfecting the liquid.

23. A method according to claim 18, which further comprises oxidizing the liquid from step (c) and then feeding it through a bed of activated carbon.

24. A method according to claim 19 wherein the solid filter medium has a minimum opening size of $125\mu$ and the particles of diatomaceous earth range in size from 1 to $100\mu$.

25. A method according to claim 18, which comprises, after a predetermined period of operation of step (c), recommencing step (a), terminating the feed of liquid in step (c), backwashing the solid filter medium to remove the layer of activated sludge material therefrom and disposing of the resulting effluent, then recommencing step (b) and then recommencing step (c).

26. A method according to claim 18, which comprises feeding the liquid from step (c) through a bed of activated carbon followed by disinfecting the liquid, and wherein, after a period of time, a sample of the aerobic microorganisms which collect in the carbon bed is withdrawn and added to the quantity of liquid used in step (a) or to the aqueous liquid prior to purification in step (c).

27. A method according to claim 18, wherein the aqueous liquid is raw water from a river, lake, reservoir or other source.

28. A method according to claim 18, wherein, during step (a), samples of the liquid are analyzed for types of microorganisms and the aeration is continued until substantially all the anaerobic and pathogenic aerobic microorganisms are eliminated.

29. A method according to claim 18, wherein the aeration in step (a) is continued for at least five days.

30. Apparatus for purifying an aqueous liquid containing undesired aerobic and anaerobic microorganisms and other contaminants, comprising:
(a) a solid backwashable filter medium;
(b) pipe means for supplying liquid to said filter medium and for conveying filtered liquid from said filter medium; and
(c) means for forming a layer of sludge material comprising specific non-pathogenic aerobic microorganisms on said solid backwashable filter medium, said means comprising:
(i) a container for receiving a quantity of said liquid;
(ii) means for aerating said liquid in said container;
(iii) a source of unsued diatomaceous earth particles;

(iv) means for introducing the unsued diatomaceous earth particles into said container; and (v) pipe means for recirculating the liquid and diatomaceous earth particles from the container through the filter medium and back to said container.

31. Apparatus according to claim 30 wherein said source of diatomaceous earth is a source of diatomaceous earth particles, at least some of which are large enough to be trapped by said solid filter medium.

32. Apparatus according to claim 30, further comprising pipe and valve means for backwashing said filter medium to remove the sludge material therefrom when necessary for cleaning purposes.

33. Apparatus according to claim 30 comprising a container for an activated carbon bed and pipe means for feeding the liquid conveyed from said filter medium through said activated carbon bed and means for introducing a disinfecting agent into said liquid downstream of said activated carbon container.

34. Apparatus according to claim 33 wherein the container is arranged vertically and said pipe means feeds the liquid to the top of the container so that the liquid flows downwardly therethrough.

* * * * *